US006881429B2

(12) United States Patent
Geng et al.

(10) Patent No.: US 6,881,429 B2
(45) Date of Patent: Apr. 19, 2005

(54) METHOD OF EXTRUDING BREAD DOUGH AND PRODUCTS THEREOF

(75) Inventors: Quinghuang Geng, Roseville, MN (US); Doug L. Goedeken, Blaine, MN (US); Susan M. Hayes-Jacobson, Minneapolis, MN (US); James S. Thorson, Scandia, MN (US); Jean L. Weber, Plymouth, MN (US)

(73) Assignee: The Pillsbury Company, Minneapolis, MN (US)

( * ) Notice: Subject to any disclaimer, the term of this patent is extended or adjusted under 35 U.S.C. 154(b) by 240 days.

(21) Appl. No.: 10/068,561

(22) Filed: Feb. 5, 2002

(65) Prior Publication Data

US 2003/0147998 A1 Aug. 7, 2003

(51) Int. Cl.[7] .............................................. A21D 10/00
(52) U.S. Cl. ........................ 426/94; 426/275; 426/283; 426/496; 426/516; 426/549
(58) Field of Search .......................... 426/94, 549, 516, 426/275, 283, 578, 496

(56) References Cited

U.S. PATENT DOCUMENTS

| | | | |
|---|---|---|---|
| 3,888,997 A | 6/1975 | Guibert | 426/27 |
| 4,423,078 A | 12/1983 | Darley et al. | 426/20 |
| 4,568,550 A | 2/1986 | Fulger et al. | 426/19 |
| 5,015,490 A | 5/1991 | Van Lengerich et al. | 426/549 |
| 5,049,398 A | 9/1991 | Saari et al. | 426/20 |
| 5,089,283 A | 2/1992 | Wilson | 426/498 |
| 5,417,992 A | 5/1995 | Rizvi et al. | 426/283 |
| 5,886,168 A * | 3/1999 | Brumm | 536/103 |
| 6,068,863 A | 5/2000 | Dupart et al. | 426/18 |
| 6,180,151 B1 | 1/2001 | Geng et al. | 426/448 |
| 6,277,423 B1 | 8/2001 | Orosa et al. | 426/445 |

OTHER PUBLICATIONS

Elements of Food Technology, 1977, p. 37.*

* cited by examiner

*Primary Examiner*—Lien Tran
(74) *Attorney, Agent, or Firm*—Dale A. Bjorkman; Paul J. Parins; Arlene L. Hornilla

(57) ABSTRACT

Methods for making an uncooked extruded dough product are provided, comprising extruding a dough composition of pre-gelatinized starch comprising at least about 75 percent of amylopectin, flour, leavening agent and water through a die under conditions so that the dough composition does not exceed 140° F. throughout the extrusion process. The resulting dough product when cooked has a baked specific volume of greater than about 3.0 cc/g. Products of this process, including filled products, are also provided.

31 Claims, No Drawings

METHOD OF EXTRUDING BREAD DOUGH AND PRODUCTS THEREOF

FIELD OF THE INVENTION

The present invention relates to a method for making a bread dough product. More specifically, the present invention relates to an extrusion process for making an uncooked extruded bread dough product.

BACKGROUND OF THE INVENTION

Consumers are always seeking high-quality comestibles that are easy to prepare and easy to eat. When such a product is easy to manufacture, costs may also be low for this product. In the case of bread-like products, the bread portion of the product should have appropriate volume, crumb texture, and mouthfeel. The texture of the product should not be too chewy or tough, and the crust should preferably be brown and have the proper texture.

Extrusion processes have been used for the formation of certain dough products. The extrusion process offers an efficient and cost-effective approach for the formation of both cooked and uncooked products. Uncooked extrusion products are prepared by a cold extrusion method, and the resulting products typically are cooked either by the manufacturer or the consumer. Perhaps the most common example of an uncooked or raw extrusion product is pasta. In the past, cold extrusion processes have been used to make dense products. This type of product is a natural outcome of extrusion processes, because extrusion operates by pushing the ingredients, often under significant pressure, up to and through a die. This high-pressure generally causes a composition to release any trapped gases present in the composition. Due to this degassing, an extruded composition generally has fewer air-containing pockets than it did before the extrusion process. This is problematic if the product being extruded is intended to be a bread-like product. Thus, breads made by an extrusion process using previously known techniques generally have a less desirable texture than like breads that are not made by an extrusion process.

Because of high pressures during extrusion, extruding is generally not suited for producing open celled or high specific volume bread-like doughs or dough-products because the die pressure can cause significant shear, degassing, and tearing to the cellular structure which holds trapped gases. Bread-like products that have been extruded generally appear translucent because little or no air is trapped in the cell walls. Such products are generally denser than desired.

U.S. Pat. No. 6,180,151 to Geng, et al. describes a method of extruding dough products at a temperature less than about 145° F. The dough contains a chemical leavener system that releases carbon dioxide from the formation of the mixture through the extrusion to decrease the density of the extruded dough by at least about 5 percent relative to the corresponding extruded dough without the chemical leavener. The temperature of extrusion is identified as being at a temperature that does not cook or gelatinize the starch within the dough. See column three, lines 1–4. The resulting product has texture approximating pie crust. See column three, line 14.

U.S. Pat. No. 6,068,863 to Dupart, et al. discloses bread products prepared by treating a starch material in water with carbohydrase, so that the starch material is gelatinized. This gelatinized starch is combined with water, a starch material, a vegetable oil and lecithin so that an emulsion is obtained. The emulsion is heated to gelatinize the starch and then dried to obtain a powder. The powder is combined by mixing with wheat flour, sugar, raising agent and water to obtain a dough. The dough may be stored at low temperature or baked. This product is stated to be microwavable.

U.S. Pat. No. 5,049,398 to Saari et al. discloses a method of baking microwave bread. The dough as described therein is made by first prehydrating a defined dough conditioner system and pregelatinized starch to form an emulsion, combining the emulsion with the other ingredients by admixing to form a dough and finish preparing the dough to produce a finished microwave baked bread loaf. See the abstract. The pregelatinized starch component is stated to be provided in an effective amount to improve the table life of the food product upon exposure to microwave heating. See column three, lines 19–22.

SUMMARY OF THE INVENTION

The present invention provides a method for making an uncooked extruded dough product, comprising extruding a dough composition comprising pre-gelatinized starch comprising at least about 75 percent amylopectin, flour, leavening agent and water through a die under conditions so that the dough composition does not exceed 140° F. throughout the extrusion process. Individual dough products are formed from the extruded dough composition. The pre-gelatinized starch, flour, leavening agent and water are present in an amount so that the resulting dough product has a baked specific volume ("BSV") of greater than about 3.0 cc/g. The uncooked product made by this process is also provided.

In one embodiment of the present invention, a method is provided wherein the dough product is a filled product. In another embodiment, the process additionally comprises the step of cooking the uncooked dough product made by the above process. The cooked product resulting from the above process is also provided.

DETAILED DESCRIPTION OF THE INVENTION

Surprisingly, it has been found that bread-like products may be prepared by using an extrusion process. By using a pregelatinized starch comprising at least about 75 percent amylopectin in the dough composition and extruding the overall composition in a cold extrusion process, it is possible to make extruded products that are truly bread-like. Thus, the dough portion of the final extruded product after baking has a baked specific volume greater than about 3.0 cc/g. In a preferred embodiment, the BSV is greater than about 3.5 cc/g. The term "baked specific volume" ("BSV") is a term of art generally known in the industry to define the inverse of density or fluffiness of a baked good, and is simply the volume of the baked product divided by its weight. The determination of BSV is of course done only on the dough portion of the baked product, and does not include any filling, if present.

The term "baked" specific volume is used herein even though the final products of the present invention are cooked using any known cooking technique that is suitable and desirable for the type of product. The term "cooking" or "cooked" as used herein refers to any appropriate method for preparing a cooked food product, including baking or frying. The term "extrusion" or "extruding" as used herein refers to a process of forcing a dough composition through an orifice under pressure of at least about 50 p.s.i., and typically from about 50 to about 150 p.s.i.

As noted above, when conventional dough is extruded, the pressure involved in the extrusion process typically leads to degassing of the bread dough. For purposes of the present invention, the term "degassing" refers to both removing the gas from the dough composition and also to redistribution and change in solubility of the gases in the dough. When the dough is placed under pressure, the gases in the dough are forced into solution. When the pressure is released, the gases form larger bubbles that generally result in a less desirable product. A dough having small bubbles or gas cells dispersed evenly throughout the dough results in a good baked product and is highly desired. Dough having large, unevenly dispersed bubbles or a lack of bubbles is referred to as degassed dough. Degassed doughs generally are not as light and airy as one would expect or hope for a bread like product. Generally, degassed dough containing products are dense, tough, and have low baked specific volume as described above. Additionally, degassed doughs made from a white flour have a crumb that is yellowish in color, rather than a more desired white crumb of certain embodiments of the present invention.

The starch component of the dough composition to be used in the present invention is a pregelatinized starch, meaning that the starch is gelatinized prior to adding to the other ingredients of the dough composition. While ungelatinized starch is insoluble in water at 20° C. (68° F.), gelatinized starch is water soluble. Thus, a 5 gram sample of gelatinized starch mixed in 100 ml water has no visible insoluble components.

Ungelatinized starch is gelatinized by heating the starch granules in the presence of water, or alternatively exposing the starch to water together with a catalyst (such as acid) or enzyme, under conditions that disrupt the amorphous regions of the starch granule, and permit hydrogen bonding between starch and water molecules. The granules are then able to absorb water and swell, thereby putting greater and greater stress on the crystalline regions. Within a certain range of temperatures, the characteristic of each starch suddenly loses all organized structure and becomes an amorphous network of starch and water intermingled. This is called the gelatinization range, because the granules become tiny gels, or liquid-containing meshworks of long molecules. This range is between about 140–148° F. for wheat flour, and between about 144 and 158° F. for corn starch. Both flour and cornstarch are produced from seeds. Other sources of starch exist which include rice starch and root starches such as arrowroot, tapioca, and potato to name a few. These starches tend to gelatinize at lower temperatures than the seed starches. As yet another source for pregelatinized starch, bread made by the same or a different process may be ground up or otherwise prepared for addition to the dough composition of the present invention in an amount sufficient to act as the source for pregelatinized starch.

The pre-gelatinized starch comprises at least about 75 percent amylopectin, more preferably at least about 80 percent, and most preferably at least about 90 percent of amylopectin. It has surprisingly been found that pre-gelatinized starches having the indicated amount of amylopectin exhibit the desired BSV, and that starches that contain less than about 75 percent amylopectin do not exhibit the desired BSV in the final baked dough product.

Pre-gelatinized starch is preferably present in the dough composition of the invention in amounts of from about 1 to about 12 percent by weight, and more preferably from about 2 percent to about 7 percent by weight of the total dough composition.

Flour used in the dough of the present invention may be any suitable flour for manufacture of bread. Appropriate flours for use in the present invention include whole grain flours, flours with the bran and/or germ removed, bleached or unbleached, or combinations thereof. Wheat flour is preferred, although non-wheat flours may be used in conjunction with wheat flours or alone if desired. For example, rye, pumpernickel, and rice flour may alternatively be used in the doughs of the present invention.

Gluten is preferably present in the present invention to provide the matrix for accommodating the leavening gas and allowing the food product of the present invention to raise. When the flour that is used the product of the present invention is wheat, gluten is naturally provided in the wheat flour, and no additional gluten need be added to the composition. Other flours may alternatively be used, with the addition of gluten as required so that the end food product may be leavened. It will be appreciated that a highly preferred embodiment of the present invention therefore utilizes wheat flour, because the gluten is automatically included in the food product of the present invention at very low cost and without additional processing steps.

Water is a necessary ingredient in doughs of the present invention. Water is added to the dough as liquid water, ice, or it is added via hydrated ingredients. Ice may be added to supply water to doughs in order to keep the combination cool during mixing. Water is preferably present in the dough in the amount up to about 50 percent by weight, and more preferably between about 25 and 45 percent by weight.

Depending upon the type of leavening desired, a leavening agent can be added to the dough to provide the desired production of carbon dioxide to leaven the dough. The leavening agent may be either yeast or a chemical leavening system, or a combination of the two. In addition or alternatively, the leavening agent may be the injection of carbon dioxide gas or other suitable gas during the extrusion process to provide the desired gas cell structure in the final product.

For purposes of the present invention, a chemical leavening system is a combination of chemical ingredients that react to produce carbon dioxide. Preferably, these chemical ingredients are a combination of an acid and a base that react to release carbon dioxide into the dough and thereby increase the volume of the dough. Suitable leavening acids are generally known in the industry and include but are not limited to citric acid, sodium acid pyrophosphate (SAPP), sodium aluminum phosphate (SALP), monocalcium phosphate (MCP), dicalcium phosphate (DCP), sodium aluminum sulfate (SAS), anhydrous monocalcium phosphate (AMCP), dimagnesium phosphate (DMP), dicalcium phosphate dihydrate (DCPD), gluconodelta lactone (GDL) and mixtures thereof. Suitable bases used in leavening agents generally include a carbonate and/or a bicarbonate salt. Suitable carbonate and bicarbonate salts include, for example, sodium carbonate, potassium carbonate, sodium bicarbonate (commonly known as baking soda), potassium bicarbonate, ammonium bicarbonate and mixtures thereof. An example of a preferred chemical leavening system is the combination of sodium bicarbonate and a combination of SAPP and SALP leavening acids.

Yeast may be used either alone or in conjunction with a chemical leavening system to leaven the dough of the present invention. Yeast provides particular flavor and textural benefits, even when not acting as the primary leavening system for the bread product. Any suitable yeast and format thereof may be utilized, including baker's yeast, activated yeast, crumbled yeast, and so forth. When yeast is used as the sole or primary leavening agent in the dough of the present invention, time for proofing the dough may be required after extrusion and before cooking of the raw dough product to obtain the desired baked specific volume. The time required for proofing depends on the composition of the dough, and may be readily determined by the practitioner.

When the leavening agent is used is yeast or a chemical leavening system, the leavening agent preferably is provided as about 1% to about 6% by weight of the dough.

The dough may optionally include fat. Possible fat ingredients include, for example, oils and shortenings. Suitable oils include, for example, soybean oil, corn oil, canola oil, olive oil, sunflower oil, peanut oil, and other vegetable or nut oils. Suitable shortenings include, for example, animal fats such as butter and hydrogenated vegetable oils such as margarine. In preferred embodiments, the dough includes no more than about 10 percent by weight of fat and more preferably from about 0.5 percent by weight to about 6 percent by weight of fat. In other preferred embodiment, such as biscuits, fat may be present in amounts up to about 20 percent by weight. Typically, fats provided in excess of about 10 percent are added in the solid chip form. Fats play a role in both the texture and flavor of the dough product. Depending upon the amount of fat included in the dough composition, the fat may interfere with the gluten structure altering the texture of the dough. Generally, more fatty doughs result in weaker gluten structures producing softer dough products. Additionally, the fat can act as a flavoring agent providing a richer tasting dough. Fats also have a tenderizing effect on bread-like products due to the fact that the lipids act to slow loss of moisture by coating the starch granules. While not being bound by theory, it is further believed that fats may act as a lubricant to enhance extrudability of the dough composition through the extrusion process.

The dough can also include a sweetener, which may be provided either as a natural or artificial sweetener or as a liquid or dry ingredient. Suitable sweeteners include but are not limited to lactose, sucrose, fructose, dextrose, maltose, corresponding sugar alcohols, corn syrup, malt and hydrolyzed corn syrup, maltodextrin, and mixtures thereof. Such sweeteners may act either or both as flavoring agents, texturizing, or browning agents. Sugar can also affect the development of the gluten, because sugar is hygroscopic and competes with the flour proteins for the available water. For this reason, high-sugar doughs tend to take longer to form and to develop. This same characteristic causes the final product to be moister, more tender, and to stay moist and tender longer, since moisture leaves the bread less readily when sugar is there to absorb it. Finally, added sugar enhances browning reactions and will make for a darker crust in a given period of baking.

The dough composition may optionally include additional flavoring agents. Such flavoring agents include but are not limited to such ingredients as salt, milk and milk products, eggs and egg products, cocoa, whey, malt, yeast, yeast extract, inactivated yeast, spices, herbs, vanilla, and commercially available flavorants, such as butter flavor. The optional flavoring agent preferably is present as greater than about 0.1 percent by weight of the dough, and more preferably is from about 0.5 and about 5.0 percent by weight of the dough.

Besides flavoring agents, the dough can further include preservatives, emulsifiers and hydrocolloids. Suitable emulsifiers include, for example, mono- and di-glycerides of fatty acids, propylene glycol mono- and di-esters of fatty acids, glycerol-lacto esters of fatty acids, ethoxylated mono-glycerides, lecithin, protein, and mixtures thereof. Preferred emulsifiers include mono-glycerides and mixtures of propylene glycol mono- and di-esters of fatty acids, mono-glycerides and lecithin. Suitable hydrocolloids assist in building viscosity, binding water, and trapping gases, which include, for example, starches, gums (e.g. xanthan and guar), cellulose, and carageenan. Preservatives, emulsifiers, and hydrocolloids combined comprise preferably less than about 5 percent by weight of the dough, and each preferably between about 0.1 percent and about 2.5 percent by weight of the dough. Suitable preservatives provide shelf-life extension for the baked product, and include, for example, potassium sorbate, sorbic acid, sodium propionate, and sodium diacetate.

Preferred dough compositions used in the method of the present invention comprise ingredients in the following amounts:

pregelatinized starch 2–7% flour 55–65% yeast or chemical leavening agent 1–6% water 28–40%.

In the case of white, wheat-based breads, an evaluation of the gas cell distribution may be numerically measured by measurement of the crumb color on the $L^*a^*b^*$ scale. Extruded white, wheat-based doughs of the present invention surprisingly have a very acceptable crumb color that is characteristic of bread doughs made in non-extrusion processes. Preferably, the extruded dough product of the present invention, when baked, has a crumb color of at least about 75, and preferably from about 80 to about 85. Crumb color is measured by standard techniques known in the art, such as by using a Minolta Chroma Meter (Model CR-300) Japan. This instrument measures color of objects on the $L^*a^*b^*$ light scale. For purposes of evaluating the crumb of a bread product, only the $L^*$ value is used because it is the measure of how "light" an object is. The $L^*$-scale ranges from 0 to 100, with 0 being black and 100 white. Each data point is the average of at least 3 readings, which are taken at different locations in the bread crumb of a single baked bread dough product. It has been found that a white, wheat-based extruded bread of the present invention having a crumb color of at least about 75 exhibits the preferred gas cell distribution and texture. Breads made from non-bleached or non-wheat flours may necessarily have a lower $L^*a^*b^*$ value due to the coloration of ingredients in the dough composition, but also may exhibit the desired gas cell distribution and texture of the baked product of the present invention. Reproducible numerical measurement of such gas cell distribution and texture can be difficult in non-white breads, but determination of whether a product has the desired gas cell distribution and texture is readily made by visual inspection of the bread product. Evaluation of the gas cell distribution and texture of the bread product in non-white breads may be assisted by comparison and correlation to reference white bread products that may be numerically measured by the $L^*a^*b^*$ scale.

During the extrusion process, the temperature of the dough must remain below about 140° F. While not being bound by theory, it is believed that this temperature cap is required to assure that any starches present in other ingredients of the dough composition, such as natural starches present in flour and like, do not gelatinize; and further that any proteins present in the composition do not denature. Maintenance of the dough at this desired temperature is preferably accomplished by ensuring that the temperature of the extruder does not exceed 140° F. Preferably, the dough is maintained at a temperature below about 120° F., and more preferably below about 100° F. As above, this temperature maximum is preferably achieved by maintenance of the temperature of the extruder below the desired temperature of the dough.

The dough as described herein may be extruded using any appropriate extruder for extruding dough, provided that the extrusion is carried out a temperature below about 140° F. For example, conventional single screw food extruders may be used to extrude the present dough compositions. Alternatively, twin screw extruders may be used with the present dough compositions, provided that the twin screw extruder (which is normally used for heated extrusion) is capable of carrying out the extrusion as a temperature below about 140° F. Combination extruder devices, that utilize single screw and twin screw components, are also contemplated.

When combining the ingredients of the dough, the order of addition of ingredients is not critical. In one embodiment of the present invention, all ingredients are simultaneously added to the extruder and mixed in the extruder. This embodiment is particularly useful in providing a continuous process for extrusion of bread dough. Alternatively, various ingredients may be pre-combined to facilitate a continuous process or a batch process. For example, the dry ingredients may first be combined alone to create a "dry blend." Dry blend ingredients include, but are not limited to, flour, leavening agents, pre-gelatinized starch, salt, and sugars. Fat, which may be added as shortening or as oil, may optionally be added directly to the dry blend. A slurry portion may be separately pre-blended. The slurry portion may include, for example, water, protein, and surfactant. Any additional liquid ingredients or those ingredients containing moisture may also be added to the slurry portion. These additional slurry ingredients may include liquid sugars. Flavoring agents are generally added into the slurry portion of the composition. Alternatively, the flavoring agents may be added to the dry blend, particularly if they are substantially anhydrous. The slurry portion is added to the dry blend-oil combination and mixed until a dough is formed. Combining such ingredients is accomplished by any means commonly known in the baking industry. These include, for example, combining the ingredients in a stand mixer fitted with a dough hook or by combining the ingredients in a twin screw premixer.

The following mixing method is preferably employed. The dry blend ingredients are combined and added into a twin screw premixer. The slurry portion is then added into the premixer, followed by addition of the fat component of the dough. The ingredients are combined until gluten is barely formed. That is, mixing continues until the gluten has barely formed so as not to create tough or highly developed dough. The dough is then fed into an extruder and pushed out of a selected die orifice that is suited for whatever type of product is being manufactured. As previously stated, the premixer and the extruder must remain at temperatures that do not allow the dough temperature to rise above 140° F.

The dough product can either be filled or unfilled. In a preferred embodiment, the extruder is fitted with a filling pump, such that dough reaching the die surrounds a filling and forms a coextrusion. Coextrusion is well known in the art. The relative amount of filling and dough is adjusted by the relative speed of the extruder screw and the flow rate of the filling. When a filling is used, a structure of the dough surrounding the filling exits from the die during the extrusion process. The shape and size of the dough product depends on the shape and size of the die. The filled dough product can be cut or otherwise separated to a desired length. Once cut, the dough can optionally be secured, for example by crimping, at one or both ends. Preferably the dough product is secured at both ends to seal the filling within the dough product.

In an alternative embodiment, the dough portion of the product is extruded to create a first dough piece for subsequent deposition of a filling thereon. The filling on the first dough piece is then optionally enclosed by folding the first dough piece or overlaminating the filling on the first dough piece with a second dough piece, followed by securing the dough pieces together, for example by crimping or the like, to seal the filling inside the dough.

The filling, if any, may be a raw or cooked food product. The filling can have a uniform consistency or a chunky consistency. In preferred embodiments, the filling is a highly viscous liquid, suspension or pseudoliquid, i.e., a flowable mixture of particulates and/or liquid that may not normally be a liquid or a suspension. The material preferably is highly viscous such that it will not flow immediately through any imperfection in a dough covering or out from the ends of seams of the product when cut and crimped after exiting the extruder.

The filling can be made from any type or types of food ingredients, including savory or sweet ingredients. Examples of savory ingredients include but are not limited to meat, vegetable, and dairy ingredients. Examples of sweet ingredients include but are not limited to fruit or icing ingredients. Both savory and sweet ingredients may further include spices, herbs, flavoring agents, fats, and the like. The filling may further include such ingredients as preservatives and consistency modifiers such as emulsifiers and thickening agents.

EXAMPLES

Example 1

This example illustrates a dough composition of the present invention, together with a process for combining and extruding such dough. The dough of this example is useful for making a filled bread or filled food pocket type product. Examples of such products include a fully encased barbecue sandwich, sloppy joe, or pizza burger. The dough of this example was not filled, but was extruded in the form of a tube that is easily provided with a filling by coextrusion or subsequent filling operation.

The ingredients of the leavening agent were combined in the following amounts:

| Ingredient | Percent by weight in final dough composition |
|---|---|
| AMCP (anhydrous monocalcium phosphate) | 0.24 |
| SAPP (sodium acid pyrophosphate) | 0.28 |
| SALP (sodium aluminum phosphate) | 0.39 |
| Total | 0.91 |

A dry blend was formed containing the following ingredients:

| Ingredient | Percent by weight in final dough composition |
| --- | --- |
| Flour | 48.21 |
| Soda (sodium bicarbonate) | 0.70 |
| Pre-gelatinized Starch* | 4.86 |
| Sucrose | 3.86 |
| Salt | 0.46 |
| Leavening Agent | 0.91 |
| Total | 59.00 |

*"X'Pand R" starch, a waxy cornstarch commercially available from the A. E. Staley Manufacturing Company, Decatur, IL, having an amylopectin content at or near 100%.

A slurry was prepared having the following ingredients and amounts:

| Ingredient | Percent by weight in final dough composition |
| --- | --- |
| Water | 36.32 |
| Flavoring agent* | 0.42 |
| Anhydrous monoglyceride | 0.21 |
| Milk protein** | 1.05 |
| Total | 38.00 |

*Natural butter WONF #12331, manufactured by Degussa Flavors & Fruit Systems.
**Available from DMV International of the Netherlands. MPC-80 is a milk protein.

The dry blend containing the leavening agents was fed into a Buhler (Switerzland) TPX extruder. Oil was added to the twin screw premixer in the amount of 3 weight percent of the total. The dough was extruded out of a donut shaped die orifice under a pressure of 50–100 p.s.i., with throughputs of about 270 lbs/hr, to form raw dough product. The raw product was then baked at 350° F. for 18 minutes. The cooked product had a baked specific volume of 3.8 cc/g.

Example 2

A dough was made in the manner of Example 1, above, with the following ingredients:

The ingredients of the leavening agent were combined in the following amounts:

| Ingredient | Percent by weight in final dough composition |
| --- | --- |
| AMCP (anhydrous monocalcium phosphate) | 0.24 |
| SAPP (sodium acid pyrophosphate) | 0.30 |
| SALP (sodium aluminum phosphate) | 0.40 |
| Total | 0.94 |

A dry blend was formed containing the following ingredients:

| Ingredient | Percent by weight in final dough composition |
| --- | --- |
| Flour | 47.60 |
| Soda (sodium bicarbonate) | 0.72 |
| Pre-gelatinized Starch* | 5.00 |
| Sucrose | 3.97 |
| Salt | 0.47 |
| Leavening Agent | 0.94 |
| Total | 58.70 |

*"Textaid A," a starch commercially available from National Starch Company having an amylopectin content of about 75%.

A slurry was prepared having the following ingredients and amounts:

| Ingredient | Percent by weight in final dough composition |
| --- | --- |
| Water | 36.69 |
| Oil | 2.98 |
| Flavoring agent** | 0.40 |
| Anhydrous monoglyceride | 0.20 |
| Milk protein*** | 1.00 |
| Total | 41.30 |

**Natural butter WONF #12331, manufactured by Degussa Flavors & Fruit Systems.
***Available from DMV International of the Netherlands. MPC-80 is a milk protein.

The dry blend containing the leavening agents was fed into a Buhler (Switzerland) TPX extruder, with total throughput of 270 lbs/hr. The dough was extruded out of a donut shaped die orifice under a pressure of 50–100 p.s.i. to form raw dough product. The raw product was then baked at 350° F. for 18 minutes. The cooked product had a baked specific volume of 3.2 cc/g.

The embodiments described herein are illustrative in nature, and are not intended to limit the scope of the invention. One skilled in the art will recognize that variations are possible without departing from the spirit or scope of the invention.

What is claimed:

1. A method for making an uncooked extruded bread-like dough product, comprising:

a. extruding a dough composition comprising pre-gelatinized starch comprising at least about 90 percent of amylopectin, flour, leavening agent and water through a die under conditions so that temperature of the dough composition does not exceed 140° F. throughout the extrusion process; and b. forming individual dough products from the extruded dough composition;

wherein said pre-gelatinized starch, flour, leavening agent and water are present in an amount so that the dough product has a BSV of greater than about 3.0 cc/g.

2. The method of claim 1, wherein said dough composition comprises from about 1 to about 12% by weight of pregelatinized starch.

3. The method of claim 1, wherein said dough composition comprises from about 2 to about 7% by weight of pregelatinized starch.

4. The method of claim 1, wherein said dough composition comprises:

pregelatinized starch 2–7% flour 55–65% yeast or chemical leavening agent 1–6% water 28–40%.

5. The method of claim 1, wherein the dough product has a BSV greater than 3.5 cc/g.

6. The method of claim 1, wherein the dough composition does not reach a temperature above about 120° F. throughout the extrusion process.

7. The method of claim 1, said dough product further comprising a filling.

8. The method of claim 7, wherein said filling is deposited on the individual dough product, said method further comprising the step of folding said individual dough product, thereby enclosing said filling within said individual dough product; and securing said dough product, thereby sealing said filling within said individual dough product.

9. The method of claim 7, wherein said filling is deposited on the individual dough product, said method further comprising the step of overlaminating said individual dough product and filling with a second dough piece, thereby enclosing said filling; and securing said individual dough product together with said second dough piece, thereby sealing said filling within said individual dough product and said second dough piece.

10. The method of claim 7, wherein said dough product is coextruded with a filling to form a filled product.

11. The method of claim 10, further comprising the step of securing said coextruded dough product, thereby sealing said filling within said coextruded dough product.

12. The uncooked extruded dough product made by the method of claim 1.

13. The uncooked extruded dough product made by the method of claim 7.

14. The uncooked extruded dough product made by the method of claim 10.

15. The dough product of claim 12, wherein said dough composition comprises between about 1–12% by weight of pregelatinized starch.

16. The dough product of claim 12, wherein said dough composition comprises between about 2–7% by weight of pregelatinized starch.

17. The dough product of claim 12, wherein said dough composition comprises:

pregelatinized starch 2–7% flour 55–65% yeast or chemical leavening agent 1–6% water 28–40%.

18. The dough product of claim 12, wherein the dough product has a BSV greater than 3.5 cc/g.

19. The dough product of claim 12, wherein the dough product is a white, wheat-based bread product that, when baked, has a crumb color having an L-value of at least about 75.

20. The dough product of claim 12, wherein the dough product is a white, wheat-based bread product that, when baked, has a crumb color having an L-value of from about 80 to about 85.

21. A process of preparing a cooked extruded dough product, comprising the step of cooking an uncooked extruded dough product of claim 12.

22. A process of preparing a cooked extruded dough product, comprising the step of cooking an uncooked extruded dough product of claim 13.

23. A process of preparing a cooked extruded dough product, comprising the step of cooking an uncooked extruded dough product of claim 14.

24. A cooked dough product made by the method of claim 21.

25. A cooked dough product made by the method of claim 22.

26. A cooked dough product made by the method of claim 23.

27. A cooked dough product of claim 24, wherein said dough product is baked.

28. A cooked dough product of claim 25, wherein said dough product is baked.

29. A cooked dough product of claim 26, wherein said dough product is baked.

30. The method of claim 1, wherein the extruding step comprises forcing the dough composition through an orifice under pressure of at least about 50 p.s.i.

31. The method of claim 1, further comprising the step of cooking the formed individual dough products, wherein there is no intermediate proofing step between the forming step and the cooking step.

* * * * *

UNITED STATES PATENT AND TRADEMARK OFFICE
CERTIFICATE OF CORRECTION

PATENT NO. : 6,881,429 B2
DATED : April 19, 2005
INVENTOR(S) : Geng et al.

It is certified that error appears in the above-identified patent and that said Letters Patent is hereby corrected as shown below:

<u>Title page,</u>
Item [75], Inventors, "Quinghuang Geng" should read -- Qinghuang Geng --.

Signed and Sealed this

Eleventh Day of October , 2005

JON W. DUDAS
*Director of the United States Patent and Trademark Office*